(12) United States Patent
Wang et al.

(10) Patent No.: US 12,127,147 B2
(45) Date of Patent: Oct. 22, 2024

(54) SYNCHRONIZATION CORRECTION METHOD, MASTER DEVICE AND SLAVE DEVICE

(71) Applicant: Ufi Space co., Ltd., New Taipei (TW)

(72) Inventors: Yu-Min Wang, Taoyuan (TW); Chih Wei Chang, New Taipei (TW)

(73) Assignee: Ufi Space co., Ltd., New Taipei (TW)

( * ) Notice: Subject to any disclaimer, the term of this patent is extended or adjusted under 35 U.S.C. 154(b) by 533 days.

(21) Appl. No.: 17/530,469

(22) Filed: Nov. 19, 2021

(65) Prior Publication Data

US 2023/0164725 A1    May 25, 2023

(51) Int. Cl.
*H04W 56/00* (2009.01)
(52) U.S. Cl.
CPC ..... *H04W 56/0055* (2013.01); *H04W 56/001* (2013.01)
(58) Field of Classification Search
CPC ........... H04W 56/0055; H04W 56/001; H04W 56/0015
See application file for complete search history.

(56) References Cited

U.S. PATENT DOCUMENTS

| | | | | |
|---|---|---|---|---|
| 7,251,199 | B2* | 7/2007 | Eidson | G04G 7/00 368/46 |
| 11,177,896 | B2* | 11/2021 | Tai | H04J 3/0667 |

(Continued)

FOREIGN PATENT DOCUMENTS

| | | | | |
|---|---|---|---|---|
| AU | 2013204757 A1 | * 12/2013 | | G06F 1/12 |
| CN | 201127028 | 10/2008 | | |

(Continued)

OTHER PUBLICATIONS

Google Translate generated document of Chinese Patent application CN 107645768 B (Year: 2020).*

(Continued)

*Primary Examiner* — Chi H Pham
*Assistant Examiner* — Vladislav Y Agureyev
(74) *Attorney, Agent, or Firm* — JCIPRNET

(57) ABSTRACT

A synchronization correction method, a master device, and a slave device are provided. The method includes: transmitting a synchronization signal frame to a slave device during a first period of an $i^{th}$ second, where the synchronization signal frame includes a synchronization header, a first pulse per second (1PPS) signal, first time of date information, and first phase compensation information, where the first phase compensation information is configured to request the slave device to correct a transmission time point at which a first reference 1PPS signal is transmitted during a second period of the $i^{th}$ second; receiving the first reference 1PPS signal from the slave device during the second period of the $i^{th}$ second; and determining second phase compensation information transmitted to the slave device according to a receiving time point at which the first reference 1PPS signal is received during a first period of an $(i+1)^{th}$ second.

16 Claims, 7 Drawing Sheets

(56) References Cited

U.S. PATENT DOCUMENTS

| | | | |
|---|---|---|---|
| 11,272,465 B2* | 3/2022 | Powell | H04W 56/00 |
| 2003/0117899 A1* | 6/2003 | Eidson | H04J 3/0664 |
| | | | 368/46 |
| 2004/0081193 A1* | 4/2004 | Forest | H04L 12/4035 |
| | | | 370/458 |
| 2013/0028265 A1* | 1/2013 | Ronchetti | H04L 43/0858 |
| | | | 370/400 |
| 2015/0134864 A1* | 5/2015 | Foster | G06F 1/12 |
| | | | 710/106 |
| 2016/0087738 A1* | 3/2016 | Jeon | H04J 3/0667 |
| | | | 370/350 |
| 2017/0195980 A1* | 7/2017 | Aggarwal | H04W 56/005 |
| 2017/0302342 A1* | 10/2017 | Kurchuk | H04B 1/405 |
| 2018/0097610 A1* | 4/2018 | Ogawa | H04L 7/0016 |
| 2018/0098330 A1* | 4/2018 | Nguyen | G06N 7/01 |
| 2019/0150072 A1* | 5/2019 | Barzegar | H02P 29/40 |
| | | | 370/338 |
| 2019/0327010 A1* | 10/2019 | Wang | H04J 3/0667 |
| 2020/0127752 A1* | 4/2020 | Tai | H04J 3/0667 |
| 2020/0236665 A1* | 7/2020 | Ginde | H04B 1/7073 |
| 2020/0267669 A1* | 8/2020 | Powell | H04W 56/00 |
| 2022/0007317 A1* | 1/2022 | Kitagawa | H04W 56/003 |
| 2022/0120915 A1* | 4/2022 | Hoptroff | H04L 43/106 |
| 2022/0123849 A1* | 4/2022 | McCall | H04J 3/0658 |
| 2022/0239541 A1* | 7/2022 | Moghaddam | H04W 56/001 |
| 2022/0400449 A1* | 12/2022 | Mori | H04B 1/0007 |

FOREIGN PATENT DOCUMENTS

| | | | | |
|---|---|---|---|---|
| CN | 102420609 | | 4/2012 | |
| CN | 107911207 A | * | 4/2018 | |
| CN | 111092713 A | * | 5/2020 | H04J 3/0638 |
| CN | 107645768 B | * | 9/2020 | |
| CN | 108594284 B | * | 3/2021 | G01S 19/48 |
| JP | 2014073369 A | * | 4/2014 | |
| TW | 201802700 | | 1/2018 | |
| TW | M628940 | | 7/2022 | |
| WO | WO-2016095972 A1 | * | 6/2016 | H04J 3/0667 |
| WO | WO-2017063450 A1 | * | 4/2017 | H04J 3/00 |

OTHER PUBLICATIONS

Timelink Microsystems, "General Description of Irig B Format", retrieved from http://www.timelinkmicro.info, pp. 1-2.
Renesas Electronics Corporation, "Synchronization Management Unit, 8A34002 Datasheet", Sep. 8, 2020, pp. 1-107.
"Office Action of Taiwan Counterpart Application", issued on Nov. 24, 2022, p. 1-p. 9.

* cited by examiner

SYNCHRONIZATION CORRECTION METHOD, MASTER DEVICE AND SLAVE DEVICE

BACKGROUND

Technical Field

The disclosure relates to a synchronization mechanism between devices, and in particular, relates to a synchronization correction method, a master device, and a slave device.

Description of Related Art

With reference to FIG. 1A, which is a schematic diagram of a synchronization mechanism according to the related art. In FIG. 1A, a master device may be connected to a slave device through three signal transmission lines. The master device may transmit frequency information (e.g., 10 MHz), phase information (e.g., a pulse per second (1PPS) signal), and time of date (ToD) information to the slave device through these signal transmission lines, such that the slave device may synchronize accordingly.

However, since 3 signal transmission lines are required in the mechanism provided in FIG. 1A, wiring provided by this mechanism is not convenient.

With reference to FIG. 1B, which is schematic diagram of another synchronization mechanism according to the related art. In FIG. 1B, a master device may be connected to a slave device through a single signal transmission line and may send a synchronization signal (e.g., an embedded PPS (ePPS)) to the slave device through pulse width modulation (PWM), so as to implement the technology of inter-range instrumentation group B (IRIG-B), for example.

With reference to FIG. 1C, which is a schematic diagram of PWM according to the related art. In this embodiment, the bit "0" may be modulated to a pulse wave with a duty cycle of 25% based on the concept of PWM, for example, and the bit "1" may be modulated to a pulse wave with a duty cycle of 75% based on the concept of PWM, for example. In FIG. 1C, the signal "1011" may be modulated to the pulse sequence as shown, for example, according to the above principle, but it is not limited thereto.

In FIG. 1B, it can be seen that the wiring difficulty is lowered, but since the master device transmits signals to the slave device in one direction, the slave device cannot know the delay error caused by the line length or other factors.

SUMMARY

Accordingly, the disclosure provides a synchronization correction method, a master device, and a slave device aiming to solve the foregoing technical problem.

The disclosure provides a synchronization correction method suitable for a master device, and the method include the following steps. A synchronization signal frame is transmitted to a slave device during a first period of an $i^{th}$ second. The synchronization signal frame includes a synchronization header, a first pulse per second (1PPS) signal, first time of date information, and first phase compensation information. The first phase compensation information is configured to request the slave device to correct a transmission time point at which a first reference 1PPS signal is transmitted during a second period of the $i^{th}$ second. The first reference 1PPS signal is received from the slave device during the second period of the $i^{th}$ second. According to a receiving time point at which the first reference 1PPS signal is received, second phase compensation information transmitted to the slave device is determined during a first period of an $(i+1)^{th}$ second.

The disclosure further provides a master device including a processing circuit and a compensation estimation circuit. The processing circuit is configured to transmit a synchronization signal frame to a slave device during a first period of an $i^{th}$ second. The synchronization signal frame includes a synchronization header, a first pulse per second (1PPS) signal, first time of date information, and first phase compensation information. The first phase compensation information is configured to request the slave device to correct a transmission time point at which a first reference 1PPS signal is transmitted during a second period of the $i^{th}$ second. The compensation estimation circuit is coupled to the processing circuit and is configured for receiving the first reference 1PPS signal from the slave device during the second period of the $i^{th}$ second and determining second phase compensation information transmitted to the slave device according to a receiving time point at which the first reference 1PPS signal is received during a first period of an $(i+1)^{th}$ second.

The disclosure further provides a synchronization correction method suitable for a slave device, and the method include the following steps. During a first period of an $i^{th}$ second, a synchronization signal frame is received from a master device. The synchronization signal frame includes a synchronization header, a first pulse per second (1PPS) signal, first time of date information, and first phase compensation information. According to the first phase compensation information, a transmission time point at which a first reference 1PPS signal is transmitted during a second period of the $i^{th}$ second is corrected. The first reference 1PPS signal is transmitted to the master device at the transmission time point during the second period of the $i^{th}$ second.

The disclosure further provides a slave device including a receiver and a processing circuit. The receiver is configured to receive a synchronization signal frame from a master device during a first period of an $i^{th}$ second. The synchronization signal frame includes a synchronization header, a first pulse per second (1PPS) signal, first time of date information, and first phase compensation information. The processing circuit is coupled to the receiver and is configured for correcting a transmission time point at which a first reference 1PPS signal is transmitted during a second period of the $i^{th}$ second according to the first phase compensation information and transmitting the first reference 1PPS signal to the master device at the transmission time point during the second period of the $i^{th}$ second.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
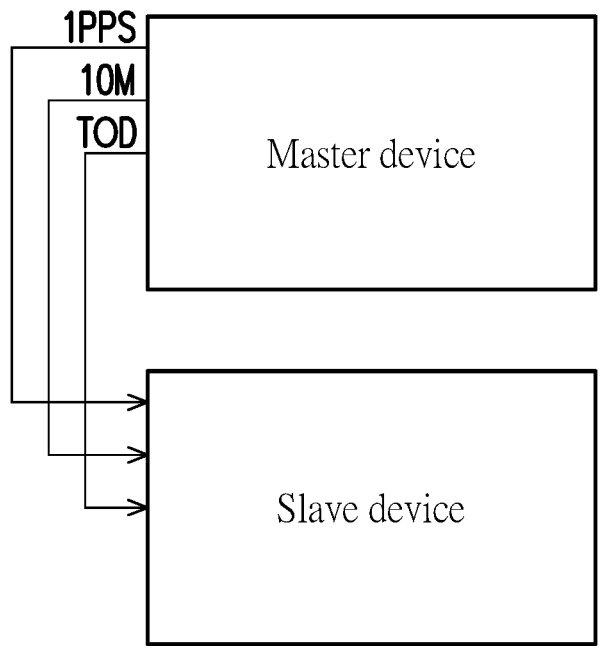
FIG. 1A is a schematic diagram of a synchronization mechanism according to the related art.
Figure 1B:
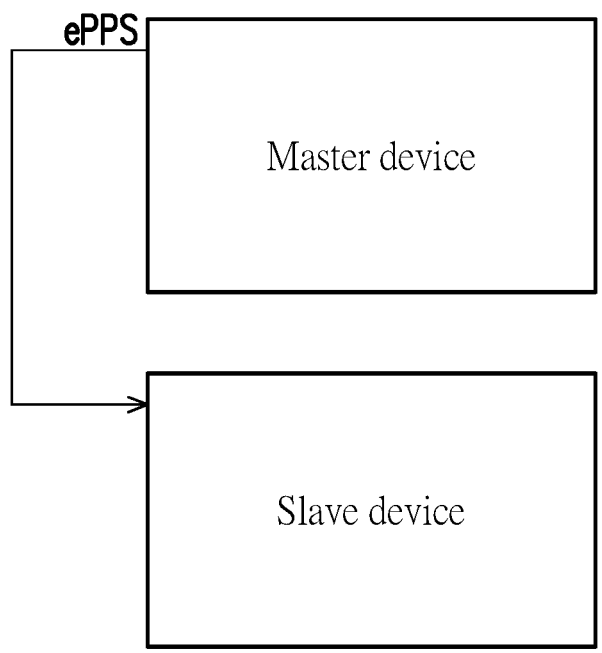
FIG. 1B is a schematic diagram of another synchronization mechanism according to the related art.
Figure 1C:
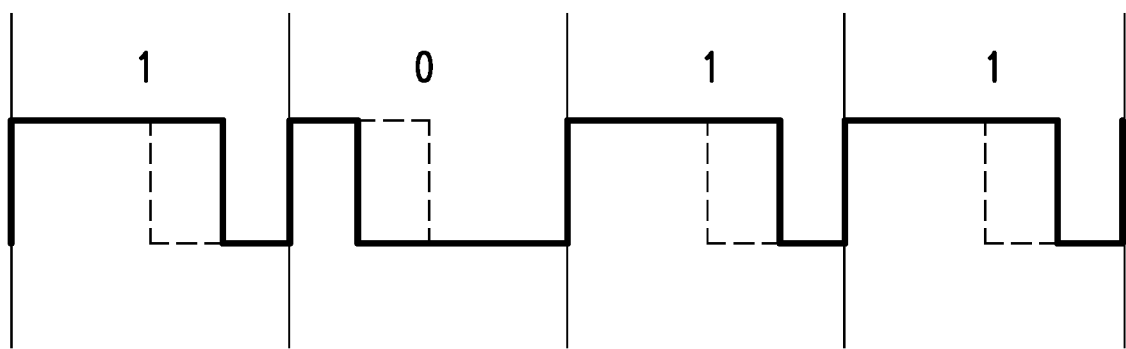
FIG. 1C is a schematic diagram of pulse width modulation (PWM) according to the related art.
Figure 2:
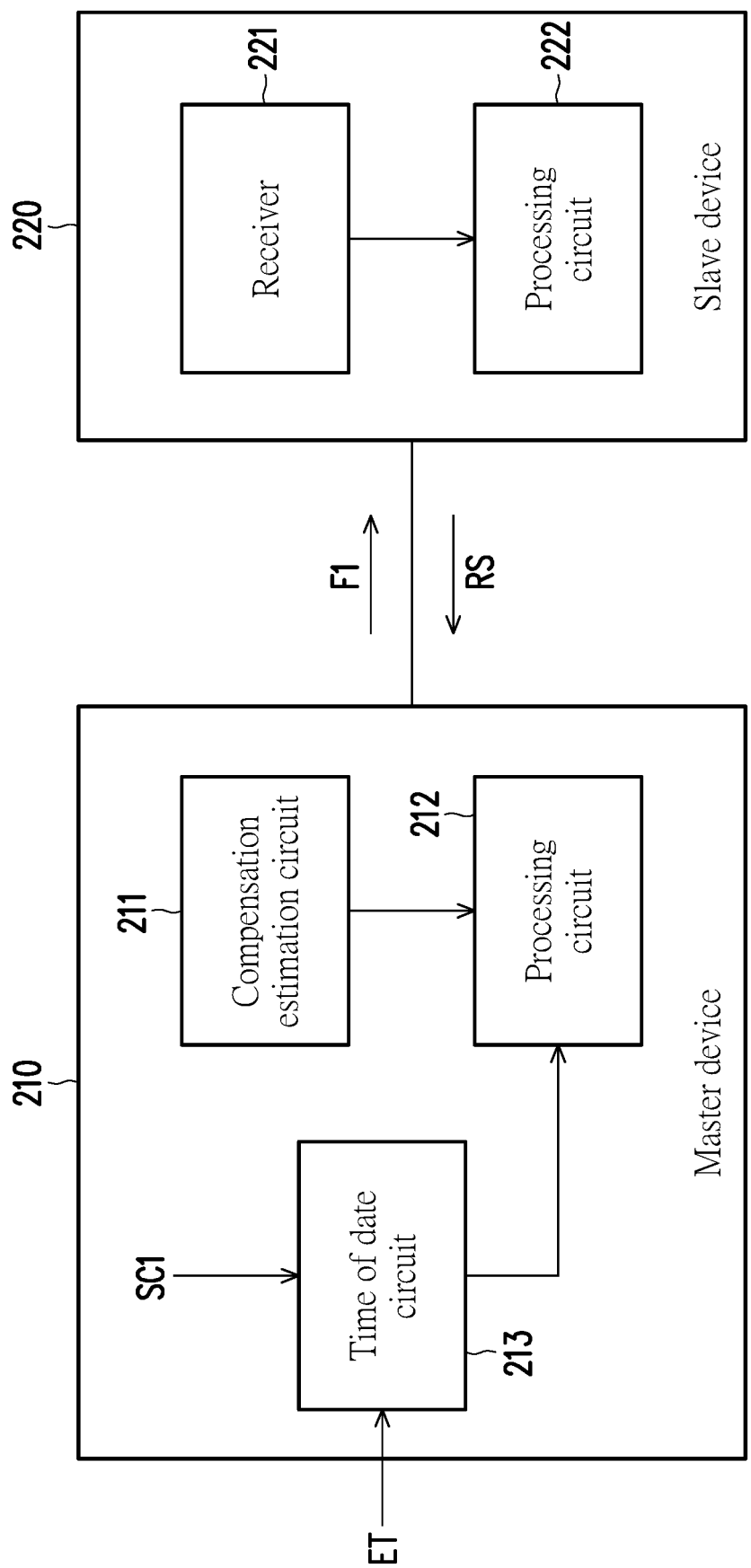
FIG. 2 is a schematic diagram illustrating a synchronization system according to an embodiment of the disclosure.

With reference to FIG. 2, which is a schematic diagram illustrating a synchronization system according to an embodiment of the disclosure. In FIG. 2, a synchronization system 200 includes a master device 210 and a slave device 220, and master device 210 and the slave device 220 may be connected through a bidirectional transmission interface (e.g., a synchronous serial bus). That is, in some embodiments, in addition to sending information required for synchronization to the slave device 220, the master device 210 may further receive feedback information from the slave device 220. The master device 210 and the slave device 220 may perform synchronization correction in this bidirectional communication mechanism.

In an embodiment, the master device 210 includes a compensation estimation circuit 211 and a processing circuit 212, and the processing circuit 212 is coupled to the compensation estimation circuit 211. In some embodiments, the master device 210 may further include a time of date circuit 213 coupled to the processing circuit 212, but it is not limited thereto. Besides, the slave device 220 includes a receiver 221 and a processing circuit 222 coupled to each other.

In the embodiments of the disclosure, a synchronization correction method provided by the disclosure may be implemented through the master device 210 and the slave device 220, and details thereof are provided as follows.

Figure 3:
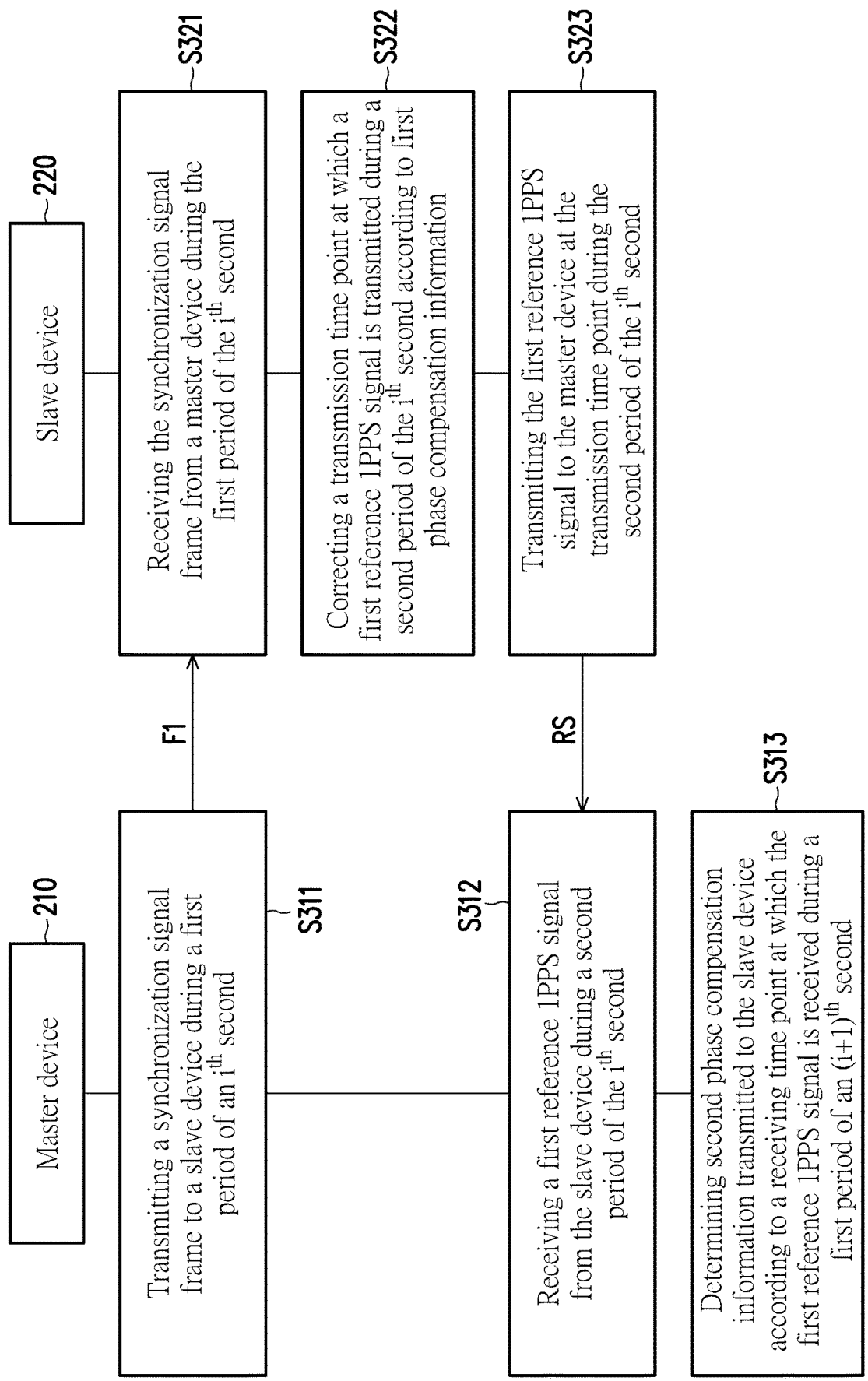
FIG. 3 is a flow chart illustrating a synchronization correction method according to an embodiment of the disclosure.

With reference to FIG. 3, which is a flow chart illustrating a synchronization correction method according to an embodiment of the disclosure. The method provided by this embodiment may be executed by the master device 210 and the slave device 220, and each step in FIG. 3 is described in detail together with the elements shown in FIG. 2.

In the embodiments of the disclosure, the principle of operation performed by the master device 210 and the slave device 220 in a time interval of every second is substantially the same/similar. Therefore, the operation performed in an $i^{th}$ second is temporarily used as an example for description below, but it is not limited thereto.

First, in step S311, the processing circuit 212 of the master device 210 transmits a synchronization signal frame F1 to the slave device 220 during a first period of the $i^{th}$ second. Correspondingly, in step S321, during the first period of the $i^{th}$ second, the receiver 221 of the slave device 220 receives the synchronization signal frame F1 from the master device 210.

In the embodiments of the disclosure, the $i^{th}$ second may at least be divided into the first period and a second period. The first period is, for example, a period during which the master device 210 may send a signal to the slave device 220, and the second period is, for example, a period during which the master device 210 listens to the signal sent by the slave device 220, but it is not limited thereto.

Figure 4:
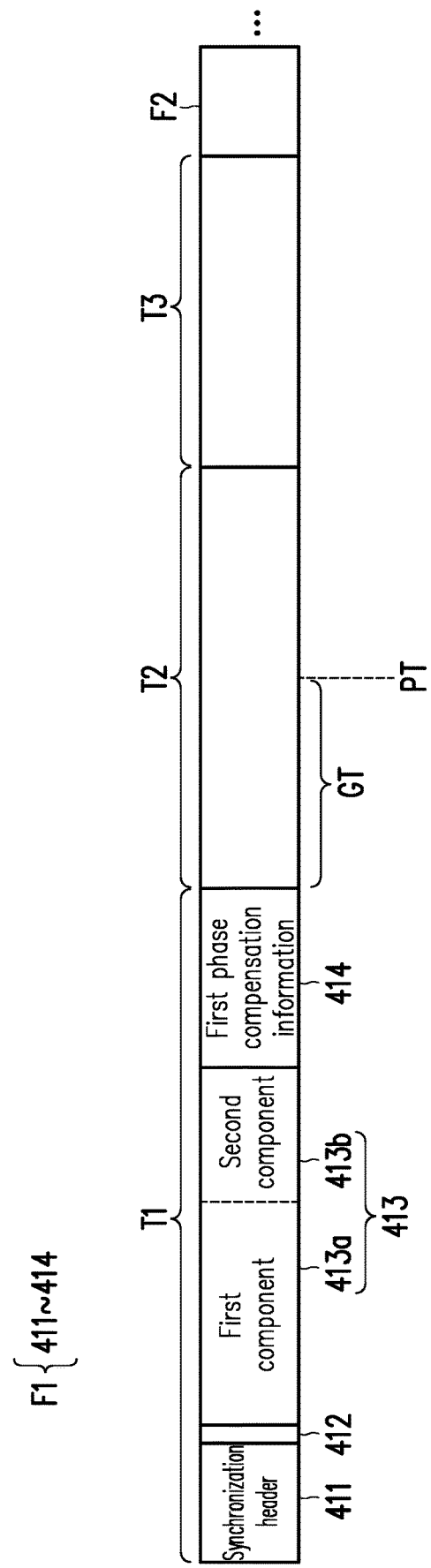
FIG. 4 is a schematic diagram illustrating a first period and a second period of an $i^{th}$ second according to an embodiment of the disclosure.

With reference to FIG. 4, which is a schematic diagram illustrating a first period and a second period of an $i^{th}$ second according to an embodiment of the disclosure. As shown in FIG. 4, the synchronization signal frame F1 transmitted by the master device 210 during a first period T1 of an $i^{th}$ second may include, for example, a synchronization header 411, a first pulse per second (1PPS) signal 412, first time of date information 413, and first phase compensation information 414. In other embodiments, a designer may adjust an order of the first 1PPS signal 412, the first time of date information 413, and the first phase compensation information 414 in the synchronization signal frame F1 according to needs, but it is not limited thereto.

In an embodiment, after obtaining content of the synchronization header 411, the first 1PPS signal 412, the first time of date information 413, and the first phase compensation information 414, the processing circuit 212 may encode the synchronization header 411, the first 1PPS signal 412, the first time of date information 413, and the first phase compensation information 414 into corresponding pulse width modulation (PWM) signals according to the above-mentioned PWM mechanism for transmission, but it is not limited thereto.

In an embodiment, the content of the synchronization header 411 may be designed as a specific bit combination. In this way, after detecting this specific bit combination, the slave device 220 may then determine that the synchronization signal frame F1 is received and further extracts the subsequent first 1PPS signal 412, the first time of day information 413, and the first phase compensation information 414 and performs subsequent operations. In different embodiments, a length and the content of the synchronization header 411 may be determined by the designer according to needs. For instance, it is assumed that the length of the synchronization header 411 is 7 bits, and its content is, for example, "1011000". In this case, when the slave device 220 detects the specific bit combination of "1011000", the slave device 220 may obtain the first 1PPS signal 412, the first time of date information 413, and the first phase compensation information 414 according to predetermined signal lengths corresponding to the first 1PPS signal 412, the first time of date information 413, and the first phase compensation information 414.

For instance, it is assumed that the predetermined signal lengths of the first 1PPS signal 412, the first time of date information 413, and the first phase compensation information 414 are 1 bit, 80 bits, and 32 bits, respectively. In this way, after the slave device 220 detects the synchronization header 411 with the content of "1011000", the slave device 220 may be configured for: determine a second bit of the synchronization header 411 as the first 1PPS signal 412; determining the 80 bits after the first 1PPS signal 412 as the first time of date information 413; and determining the 32 bits after the first time of date information 413 as the first phase compensation information 414, but it is not limited thereto.

In an embodiment, the master device 210 may determine the first time of date information 413 in the synchronization signal frame F1 through the time of date circuit 213. In an embodiment, the time of date circuit 213 may accordingly determine a first component 413a of the first time of date information 413 after obtaining external time of date ET corresponding to the $i^{th}$ second. In an embodiment, the external time of date ET is, for example, epoch time, which may be obtained by the time of date circuit 213 from the Internet or other similar external sources and may act as the first component 413a of the first time of date information 413. In the embodiments of the disclosure, in the case that the predetermined signal length of the first time of date information 413 is assumed to be 80 bits, the first component 413a may occupy the first 48 bits of the first time of date information 413, for example, but it is not limited thereto.

In an embodiment, the time of date circuit 213 estimate a second component 413b of the first time of date information 413 based on a system clock signal SC1. In an embodiment, the system clock signal SC1 may include a plurality of pulse waves, and a cycle of these pulse waves may be determined corresponding to a frequency of the system clock signal SC1, for example. For instance, assuming that the frequency of the system clock signal SC1 is 125 MHz, the cycle of these pulse waves is, for example, 8 ns (i.e., 1/125M). That is, a pulse wave appears every 8 ns.

In this case, in response to the time of date circuit 213 detecting one of the pulse waves of the system clock signal SC1, the time of date circuit 214 may increment a first count value. That is, when the frequency of the system clock signal SC1 is 125 MHz, the time of date circuit 214 increments the first count value every 8 ns. In an embodiment, the time of date circuit 214 may treat the first count value as the second component 413b of the first time of date information 413. In the embodiments of the disclosure, in the case that the predetermined signal length of the first time of date information 413 is assumed to be 80 bits and the first component 413a occupies the first 48 bits of the first time of date information 413, the second component 413b may occupy the last 32 bits of the first time of date information 413, for example, but it is not limited thereto.

In short, the first component 413a of the first time of date information 413 may be determined by the time of date circuit 413 based on the external time of date ET (with an accuracy of seconds only), and the second component 413b (with an accuracy of up to ns) of the first time of date information 413 may be counted and obtained by the time of date circuit 413 by itself, but it is not limited thereto.

In an embodiment, the first phase compensation information 414 is configured to request the slave device 220 to correct a transmission time point at which a first reference 1PPS signal RS is transmitted during a second period T2 of the $i^{th}$ second.

In brief, the slave device 220 is configured to transmit the first reference 1PPS signal RS at a predetermined time point during the second period of every second. In an embodiment, the first reference 1PPS signal RS is, for example, 1, and the other bits in the second period are, for example, 0. In other words, if a length of the second period is set to N bits, only one of the N bits is 1, and the other bits are all 0, but it is not limited thereto.

In an embodiment, if the master device 210 and the slave device 220 are perfectly synchronized, the master device 210 may receive the first reference 1PPS signal RS from the slave device 220 at a predetermined time point during the second period of every second.

However, since the synchronization between the master device 210 and the slave device 220 is generally not perfect, the master device 210 may not receive the first reference 1PPS signal from the slave device 220 at the predetermined time point during the second period. For instance, the master device 210 may receive the first reference 1PPS signal RS before/after a predetermined time point during a second period of an $(i-1)^{th}$ second. That is, a specific time difference is provided between a receiving time point of the first reference 1PPS signal RS in the second period of the $(i-1)^{th}$ second by the master device 210 and the predetermined time point. In this case, the compensation estimation circuit 211 of the master device 210 may generate the corresponding first phase compensation information 414 based on this specific time difference, so as to inform the slave device 220 of the first phase compensation information 414 through the synchronization signal frame F1 during the first period T1 of the $i^{th}$ second.

In response to the content of the first phase compensation information 414, the slave device 220 may advance/delay transmission of the first reference 1PPS signal RS during the second period T2 in an attempt to make the master device 210 receive the first reference 1PPS signal RS at the predetermined time point during the second period T2.

In an embodiment, the compensation estimation circuit 211 may obtain the predetermined time point in the second period of the $(i-1)^{th}$ second. In an embodiment, the compensation estimation circuit 211 may obtain a synchronization signal frame of the $(i-1)^{th}$ second and adds predetermined guard time after ending time of this synchronization signal frame to act as the predetermined time point in the second period of the $(i-1)^{th}$ second. In different embodiments, the predetermined guard time may be determined by the designer according to needs.

In an embodiment, assuming that the length of the second period is set to N bits, the predetermined guard time may be set to N/2 bits, for example, but it is not limited thereto. For instance, assuming that N is 240, the compensation estimation circuit 211 may add a predetermined guard time of, for example, 120 bits (i.e., 240/2) after the synchronization signal frame of the $(i-1)^{th}$ second to act as the predetermined time point in the second period of the $(i-1)^{th}$ second, but it is not limited thereto. In other words, if the master device 210 and the slave device 220 are perfectly synchronized, during the second period of the $(i-1)^{th}$ second, only the $120^{th}$ bit should be 1 (i.e., the first reference 1PPS signal RS), and the other bits are all 0. However, if the master device 210 and the slave device 220 are not perfectly synchronized, a position where the first reference 1PPS signal RS appears is not to be located at the $120^{th}$ bit during the second period.

Therefore, the compensation estimation circuit 211 may obtain the specific time difference between the receiving time point at which the first reference 1PPS signal RS is received during the second period of the $(i-1)^{th}$ second and the predetermined time point and determines the first phase compensation information 414 based on the specific time difference.

In an embodiment, in response to determining that the receiving time point is ahead of the predetermined time point by the specific time difference, the compensation estimation circuit 211 may set the first phase compensation information 414 to be configured to request the slave device 220 to delay transmission of the first reference 1PPS signal RS by the specific time difference during the second period T2 of the $i^{th}$ second. For instance, it is assumed that the position where the first reference 1PPS signal RS appears is the $118^{th}$ bit in the second period, this means that the first reference 1PPS signal RS is received by the master device 210 2 bits earlier (i.e., the specific time difference). Therefore, the compensation estimation circuit 211 may set the first phase compensation information 414 to be configured to request the slave device 220 to delay the transmission of the first reference 1PPS signal RS by 2 bits during the second period T2 of the $i^{th}$ second.

In contrast, in response to determining that the receiving time point is behind the predetermined time point by the specific time difference, the compensation estimation circuit 211 may set the first phase compensation information 414 to be configured to request the slave device 220 to advance the transmission of the first reference 1PPS signal RS by the specific time difference during the second period T2 of the $i^{th}$ second. For instance, it is assumed that the position where the first reference 1PPS signal RS appears is the $123^{th}$ bit in the second period, this means that the first reference 1PPS signal RS is received by the master device 210 3 bits later (i.e., the specific time difference). Therefore, the compensation estimation circuit 211 may set the first phase compensation information 414 to be configured to request the slave device 220 to advance the transmission of the first reference 1PPS signal RS by 3 bits during the second period T2 of the $i^{th}$ second.

In an embodiment, it is assumed that the predetermined signal length of the first phase compensation information 414 is 32 bits, the most significant bit (MSB) may be used to instruct that, for example, the slave device 220 should advance/delay transmission of the first reference 1PPS signal RS, the remaining 31 bits may be used to represent the abovementioned specific time difference. For instance, when the MSB of the first phase compensation information 414 is 1, the first phase compensation information 414 may be configured to request, for example, the slave device 220 to delay transmission of the first reference 1PPS signal RS by the specific time difference. When the MSB of the first phase compensation information 414 is 0, the first phase compensation information 414 may be configured to request, for example, the slave device 220 to advance transmission of the first reference 1PPS signal RS by the specific time difference, but it is not limited thereto.

Based on the above, in step S322, the processing circuit 222 of the slave device 220 corrects the transmission time point at which the first reference 1PPS signal RS is transmitted during the second period T2 of the $i^{th}$ second according to the first phase compensation information 414.

In an embodiment, the processing circuit 222 of the slave device 220 obtains the predetermined time point at which the first reference 1PPS signal RS is transmitted during the second period T2 of the $i^{th}$ second. In an embodiment, the processing circuit 222 of the slave device 220 may add predetermined guard time GT after ending time of the synchronization signal frame F1 to act as the predetermined time point PT, but it is not limited thereto.

Next, in response to determining that the first phase compensation information 414 instructs delayed transmission of the first reference 1PPS signal RS by the specific time difference, the processing circuit 222 may delay the predetermined time point GT by the specific time difference to act as a transmission time point PT'. For instance, when the MSB of the first phase compensation information 414 is 1, the processing circuit 222 may delay the predetermined time point PT according to the specific time difference instructed by the remaining 31 bits of the first phase compensation information 414.

On the other hand, in response to determining that the first phase compensation information 414 instructs advanced transmission of the first reference 1PPS signal RS by the specific time difference, the processing circuit 222 may advance the predetermined time point GT by the specific time difference to act as the transmission time point PT'. For instance, when the MSB of the first phase compensation information 414 is 0, the processing circuit 222 may advance the predetermined time point PT according to the specific time difference instructed by the remaining 31 bits of the first phase compensation information 414.

Next, in step S323, the processing circuit 222 of the slave device 220 transmits the first reference 1PPS signal RS to the master device 210 at the transmission time point PT' during the second period T2 of the $i^{th}$ second. Correspondingly, in step S312, the compensation estimation circuit 211 of the master device 210 receives the first reference 1PPS signal RS from the slave device 220 during the second period T2 of the $i^{th}$ second.

Next, in step S313, the compensation estimation circuit 211 determines second phase compensation information transmitted to the slave device 220 according to a receiving time point at which the first reference 1PPS signal RS is received during a first period of an $(i+1)^{th}$ second.

In an embodiment, the method for the compensation estimation circuit 211 to determine the second phase compensation information is similar to the method for determining the first phase compensation information 414. For instance, the compensation estimation circuit 211 obtains the predetermined time point PT in the second period T2 of the $i^{th}$ second. For instance, the compensation estimation circuit 211 may add the predetermined guard time GT after the ending time of the synchronization signal frame F1 to act as the predetermined time point PT of the second period T2 of the $i^{th}$ second, but it is not limited thereto. Thereafter, the compensation estimation circuit 211 may obtain the specific time difference between the receiving time point and the predetermined time point PT and determines the second phase compensation information based on this specific time difference.

In an embodiment, in response to determining that the receiving time point is ahead of the predetermined time point PT by the specific time difference, the compensation estimation circuit 211 may set the second phase compensation information to be configured to request the slave device 220 to delay transmission of the first reference 1PPS signal RS by the specific time difference during a second period of the $(i+1)^{th}$ second. In contrast, in response to determining that the receiving time point is behind the predetermined time point PT by the specific time difference, the compensation estimation circuit 211 may set the second phase compensation information to be configured to request the slave device 220 to advance the transmission of the first reference 1PPS signal RS by the specific time difference during the second period of the $(i+1)^{th}$ second. Details of the above steps may be found with reference to the description provided in the foregoing embodiments and thus are not repeated herein.

Next, the master device 210 may correspondingly generate a synchronization signal frame F2 corresponding to the $(i+1)^{th}$ second and then further controls the slave device 220 to correct a transmission time point at which the first reference 1PPS signal RS is transmitted during the second period of the $(i+1)^{th}$ second, but it is not limited thereto.

It can be seen from the above that in the embodiments of the disclosure, the master device 210 and the slave device 220 may still perform bidirectional communicate even if they are connected only through a single signal transmission line (e.g., a synchronous serial bus). Furthermore, the master device 210 may accordingly determine the phase compensation information to be provided to the slave device 220 in the next second according to situation of the first reference 1PPS signal RS fed back by the slave device 220 in the previous second. In this way, the slave device 220 may correct the time point at which the first reference 1PPS signal is transmitted according to the phase compensation information, so that the master device 210 and the slave device 220 may achieve a favorable synchronization effect with each other.

Figure 5:
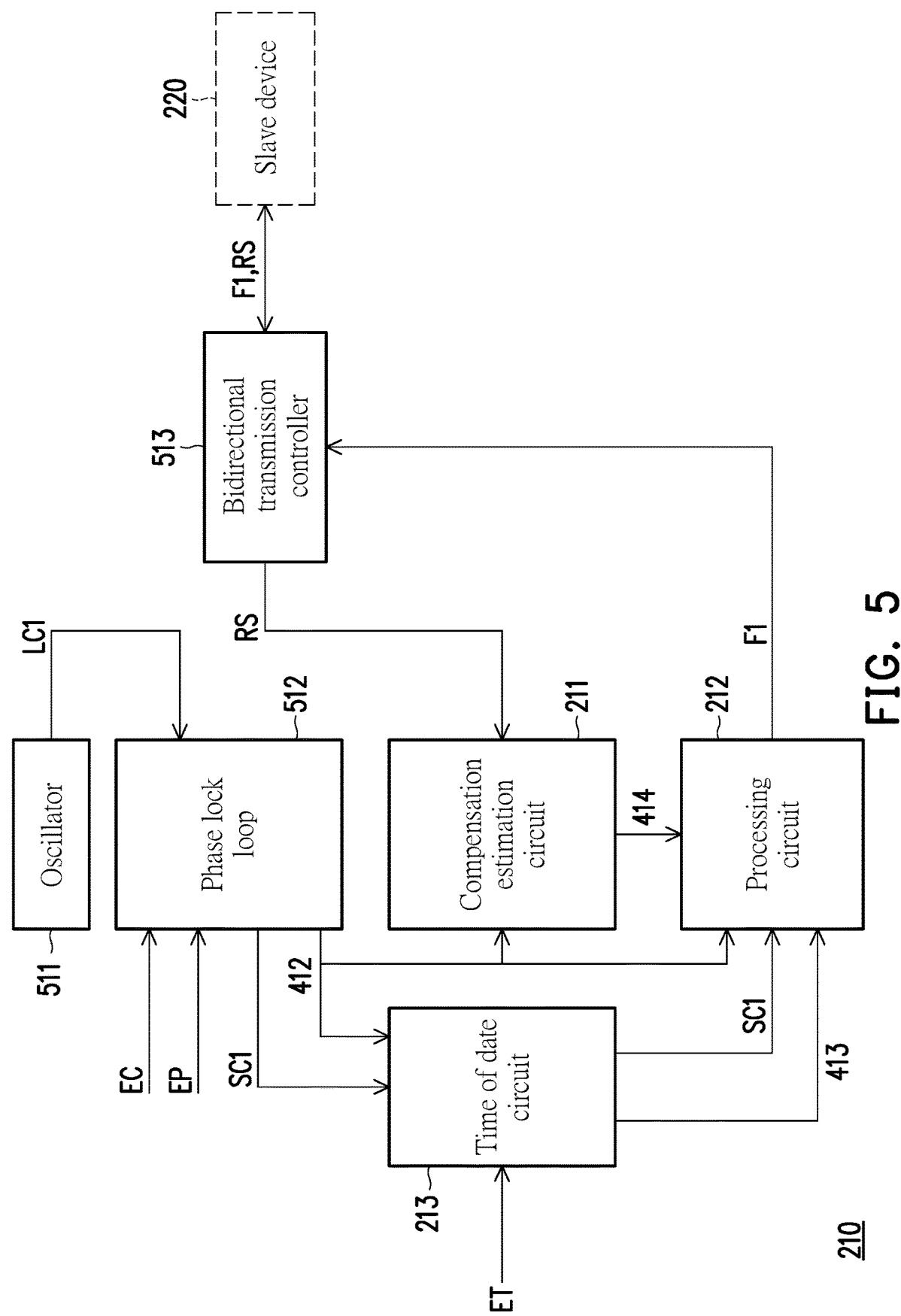
FIG. 5 is a schematic diagram illustrating a master device according to FIG. 2.

With reference to FIG. 5, which is a schematic diagram illustrating a master device according to FIG. 2. In FIG. 5, in addition to the compensation estimation circuit 211, the processing circuit 212, and the time of date circuit 213, the master device 210 may further include an oscillator 511, a phase lock loop 512, and a bidirectional transmission controller 513.

In an embodiment, the oscillator 511 is, for example, an oven controlled crystal oscillator (OCXO) or other precise and controllable clock signal generator, and may be used to provide a local clock signal LC1.

In an embodiment, the phase lock loop 512 is coupled to the oscillator 511, the compensation estimation circuit 211, the processing circuit 212, and the time of date circuit 213, and may be implemented as a digital phase lock loop (DPLL). In an embodiment, the phase lock loop 512 may receive an external clock signal EC, an external 1PPS signal EP, and the local clock signal LC1 from the oscillator 511, and may accordingly generate the system clock signal SC1 and the first 1PPS signal 412.

In an embodiment, the time of date circuit 213 may obtain the system clock signal SC1 and the first 1PPS signal 412 from the phase lock loop 512 and accordingly determine the second component 413b in the time of date information 413 according to the previous teaching.

In an embodiment, the compensation estimation circuit 211 may determine the first phase compensation information 414 according to the first reference 1PPS signal RS received during the second period of the $(i-1)^{th}$ second and provides the first phase compensation information 414 to the processing circuit 212.

In an embodiment, after obtaining the system clock signal SC1 and the time of date information 413 from the time of date circuit 213, the first 1PPS signal 412 from the phase lock loop 512, and the first phase compensation information 414 from the compensation estimation circuit 211, the processing circuit 212 may encode the abovementioned information into the synchronization signal frame F1 through a mechanism such as PWM.

In an embodiment, the bidirectional transmission controller 513 may be connected to the slave device 220, for example, and may be configured to control the bidirectional transmission between the master device 210 and the slave device 220. For instance, during the first period T1 of the $i^{th}$ second, the bidirectional transmission controller 513 may switch the synchronous serial bus between the master device 210 and the slave device 220 to a low impedance state (commonly known as a low-Z state), for example, such that the processing circuit 212 may transmit the generated synchronization signal frame F1 to the slave device 220.

Further, during the second period T2 of the $i^{th}$ second, the bidirectional transmission controller 513 may switch the synchronous serial bus between the master device 210 and the slave device 220 to a high impedance state (commonly known as a high-Z state), for example, such that the compensation estimation circuit 211 may listen to the first reference 1PPS signal RS from the slave device 220. Next, the compensation estimation circuit 211 may generate the second phase compensation information according to the first reference 1PPS signal RS received during the second period T2 to allow the processing circuit 212 to accordingly generate the synchronization signal frame corresponding to the $(i+1)^{th}$ second. Related details may be found with reference to the description provided in the foregoing embodiments, and description thereof is thus not repeated herein.

Figure 6:
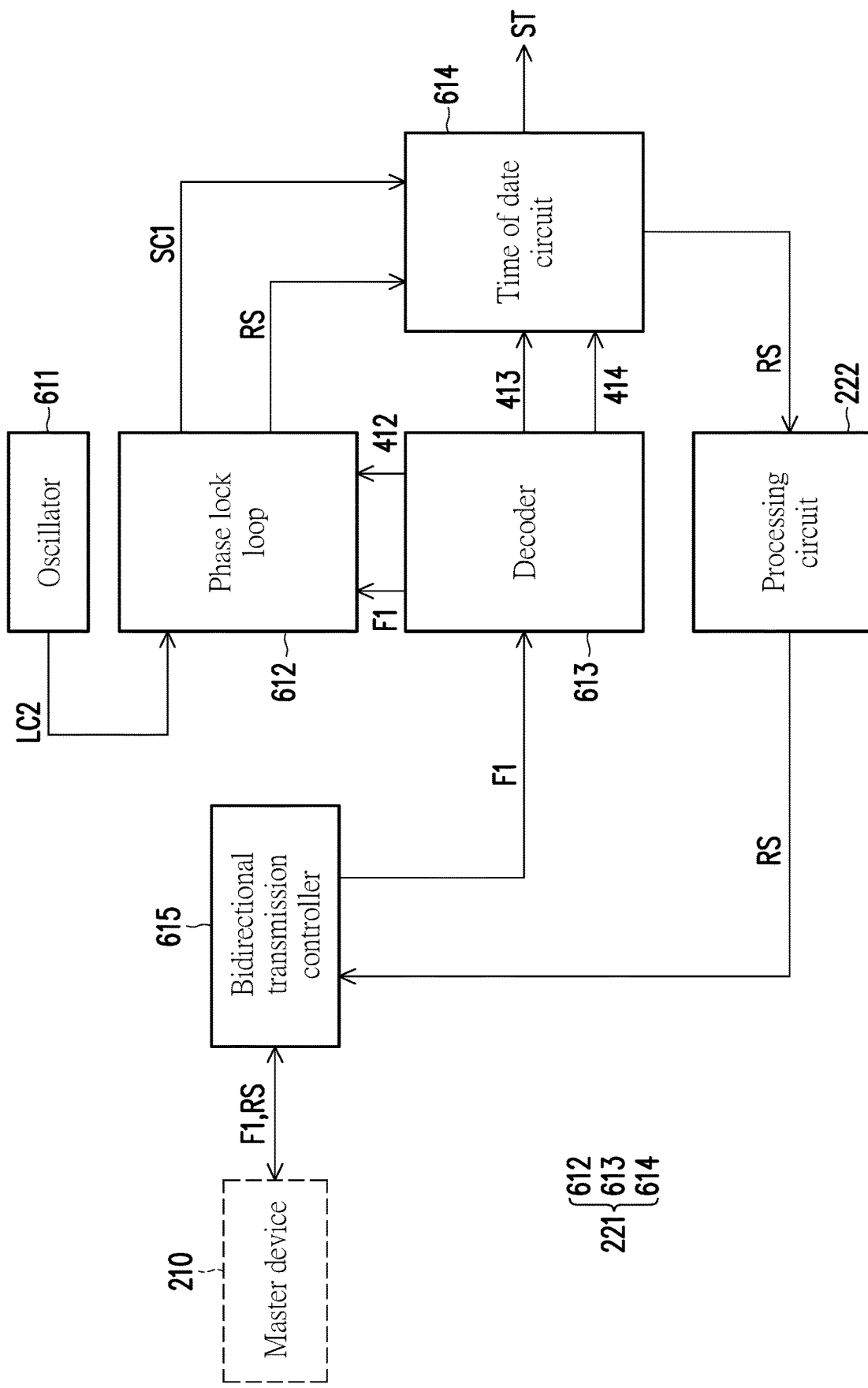
FIG. 6 is a schematic diagram illustrating a slave device according to FIG. 2.

With reference to FIG. 6, which is a schematic diagram illustrating a slave device according to FIG. 2. In FIG. 6, in addition to the receiver 221 and the processing circuit 222, the slave device 220 further includes an oscillator 611 and a bidirectional transmission controller 615.

In an embodiment, the bidirectional transmission controller 615 may be configured to receive the corresponding synchronization signal frame from the master device 210 during the first period of every second and send the first reference 1PPS signal RS provided by the processing circuit 222 to the master device 210 during the second period.

In an embodiment, the receiver 211 may include a phase lock loop 612, a decoder 613, and a time of date circuit 614. In an embodiment, during the first period T1 of the $i^{th}$ second, after obtaining the synchronization signal frame F1 of the master device 210 from the bidirectional transmission controller 615, the decoder 613 may decode the synchronization signal frame F1 to obtain the first 1PPS signal 412, the time of date information 413, the first phase compensation information 414, and a signal frequency FS corresponding to the synchronization signal frame F1, for example.

In an embodiment, the decoder 613 may estimate the signal frequency FS of the synchronization signal frame F1 based on a time difference between the respective bits in the synchronization signal frame F1. For instance, assuming that the time difference between the bits of the synchronization signal frame F1 is 8 ns, the decoder 613 may estimate that the signal frequency FS of the synchronization signal frame F1 is 125 MHz (i.e., ⅛ ns), but it is not limited thereto.

In an embodiment, the oscillator 611 is, for example, an OCXO or other precise and controllable clock signal generator, and may be used to provide a local clock signal LC2.

In an embodiment, the phase lock loop 612 is coupled to the oscillator 611 and the decoder 613 and may generate the system clock signal SC1 and the first reference 1PPS signal RS based on the local clock signal LC2 and the signal frequency FS and the first 1PPS signal 412 from the decoder 613.

In an embodiment, the time of date circuit 614 is coupled to the decoder 613 and the phase lock loop 612, may receive the time of date information 413 and the first phase compensation information 414 from the decoder 613, and may receive the system clock signal SC1 and the first reference 1PPS signal RS from the phase look loop 612.

In an embodiment, the time of date circuit 614 may treat the first component 413a of the time of date information 413 as a first time component (with an accuracy of seconds) of system time of date ST and may then estimate a second time component (with an accuracy of ns) of the system time of date ST further based on the system clock signal SC1 and the second component 413b of the time of date information 413.

For instance, as described above, the second component 413b is the first count value counted by the time of date circuit 213, and its value (represented by K) represents the number of 8 ns previously counted by the time of date circuit 213. Therefore, the time of date circuit 614 may correspondingly obtain the second time component of the system time of date ST by counting K 8 ns. Next, the time of date circuit 614 may combine (e.g., add) the abovementioned first time component and the second time component to obtain the system time of date ST, but it is not limited thereto.

In an embodiment, the time of date circuit 614 may correct the transmission time point of the first reference 1PPS signal RS based on the first phase compensation information 414. For instance, when the MSB of the first phase compensation information 414 is 1, after obtaining the predetermined time point at which the first reference 1PPS signal RS is transmitted during the second period T2 and the specific time difference instructed by the remaining 31 bits of the first phase compensation information 414, the time of date circuit 614 may delay the predetermined time point by this specific time difference to correct the transmission time point of the first reference 1PPS signal RS. On the other hand, when the MSB of the first phase compensation information 414 is 0, after obtaining the predetermined time point at which the first reference 1PPS signal RS is transmitted during the second period T2 and the specific time difference instructed by the remaining 31 bits of the first phase compensation information 414, the time of date circuit 614 may advance the predetermined time point by this specific time difference to correct the transmission time point of the first reference 1PPS signal RS.

Next, the processing circuit 222 may transmit the first reference 1PPS signal to the master device 210 according to the corrected transmission time point of first reference 1PPS signal RS provided by the time of date circuit 614.

Correspondingly, the master device 210 may then adaptively adjust the content of the second phase compensation information in the synchronization signal frame corresponding to the $(i+1)^{th}$ second according to receipt of the first reference 1PPS signal RS during the second period T2, and details thereof are not repeated herein.

In an embodiment, after the slave device 220 obtains the first 1PPS signal 412, the signal frequency FS, and the system time of date ST, the slave device 220 may accordingly perform a synchronization operation to try to synchronize with the master device 210, but it is not limited thereto.

In some embodiments, the $i^{th}$ second may further include a third period T3 shown in FIG. 4, and this third period T3 is located between the second period T2 of the $i^{th}$ second and the first period of the synchronization signal frame F2 of the $(i+1)^{th}$ second. The master device 210 and the slave device 220 may not transmit/receive during the third period T3, but it is not limited thereto. In addition, in an embodiment, the master device 210 may only transmit a frequency signal (e.g., 50% of the duty cycle) to the slave device 220 during the third period T3, so that the slave device 220 may accordingly maintain frequency synchronization with the master device 210.

In addition, in some embodiments, although the master device 210 does not send a signal to the slave device 220 during the second period T2, the phase lock loop 612 of the slave device 220 may enter a holdover mode to maintain synchronization with the master device 210 during the second period T2.

In view of the foregoing, in the embodiments of the disclosure, the master device and the slave device may still perform bidirectional communication even if they are connected only through a single signal synchronous serial bus. For instance, the master device may accordingly determine the phase compensation information to be provided to the slave device in the next second according to the situation of the first reference 1PPS signal RS fed back by the slave device in the previous second. In this way, the slave device may correct the time point at which the first reference 1PPS signal is transmitted according to the phase compensation information, so that the master device and the slave device may achieve a favorable synchronization effect with each other.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A synchronization correction method, suitable for a master device, the method comprising:
   transmitting a synchronization signal frame to a slave device during a first period of an $i^{th}$ second, wherein the synchronization signal frame comprises a synchronization header, a first pulse per second (1PPS) signal, first time of date information, and first phase compensation information, wherein the first phase compensation information is configured to request the slave device to correct a transmission time point at which a first reference 1PPS signal is transmitted during a second period of the $i^{th}$ second;
   receiving the first reference 1PPS signal from the slave device during the second period of the $i^{th}$ second; and
   determining second phase compensation information transmitted to the slave device according to a receiving time point at which the first reference 1PPS signal is received during a first period of an $(i+1)^{th}$ second, comprising:
      obtaining a predetermined time point during the second period of the $i^{th}$ second;
      obtaining a specific time difference between the receiving time point and the predetermined time point; and
      determining the second phase compensation information based on the specific time difference, comprising:
         setting the second phase compensation information to be configured to request the slave device to delay transmission of the first reference 1PPS signal by the specific time difference during a second period of the $(i+1)^{th}$ second in response to determining that the receiving time point is ahead of the predetermined time point by the specific time difference; and
         setting the second phase compensation information to be configured to request the slave device to advance the transmission of the first reference 1PPS signal by the specific time difference during the second period of the $(i+1)^{th}$ second in response to determining that the receiving time point is behind the predetermined time point by the specific time difference.

2. The method according to claim 1, wherein the step of obtaining the predetermined time point during the second period of the $i^{th}$ second further comprises:
   adding predetermined guard time after ending time of the synchronization signal frame to act as the predetermined time point in the second period of the $i^{th}$ second.

3. The method according to claim 1, further comprising:
   obtaining external time of date corresponding to the $i^{th}$ second and accordingly determining a first component of the first time of date information; and
   estimating a second component of the first time of date information based on a system clock signal.

4. The method according to claim 3, wherein the external time of date comprises epoch time, and the method comprises treating the epoch time as the first component of the first time of date information.

5. The method according to claim 3, wherein the system clock signal comprises a plurality of pulse waves, and the step of estimating the second component of the first time of date information based on the system clock signal further comprises:
  incrementing a first count value and treating the first count value as the second component of the first time of date information in response to detecting one of the pulse waves of the system clock signal.

6. The method according to claim 1, wherein the synchronization signal frame comprises the synchronization header, the first 1PPS signal, the first time of date information, and the first phase compensation information in sequence.

7. A master device, comprising:
  a processing circuit, configured for:
    transmitting a synchronization signal frame to a slave device during a first period of an $i^{th}$ second, wherein the synchronization signal frame comprises a synchronization header, a first pulse per second (1PPS) signal, first time of date information, and first phase compensation information, wherein the first phase compensation information is configured to request the slave device to correct a transmission time point at which a first reference 1PPS signal is transmitted during a second period of the $i^{th}$ second;
  a compensation estimation circuit, coupled to the processing circuit, configured for:
    receiving the first reference 1PPS signal from the slave device during the second period of the $i^{th}$ second; and
    determining second phase compensation information transmitted to the slave device according to a receiving time point at which the first reference 1PPS signal is received during a first period of an $(i+1)^{th}$ second; and
  a time of date circuit coupled to the processing circuit, wherein the time of date circuit is configured for:
    obtaining external time of date corresponding to the $i^{th}$ second and accordingly determining a first component of the first time of date information; and
    estimating a second component of the first time of date information based on a system clock signal, wherein the system clock signal comprises a plurality of pulse waves, and the time of date circuit is configured for:
      incrementing a first count value and treating the first count value as the second component of the first time of date information in response to detecting one of the pulse waves of the system clock signal.

8. The master device according to claim 7, wherein the compensation estimation circuit is configured for:
  obtaining a predetermined time point during the second period of the $i^{th}$ second;
  obtaining a specific time difference between the receiving time point and the predetermined time point; and
  determining the second phase compensation information based on the specific time difference.

9. The master device according to claim 8, wherein the compensation estimation circuit is configured for:
  setting the second phase compensation information to be configured to request the slave device to delay transmission of the first reference 1PPS signal by the specific time difference during a second period of the $(i+1)^{th}$ second in response to determining that the receiving time point is ahead of the predetermined time point by the specific time difference; and
  setting the second phase compensation information to be configured to request the slave device to advance the transmission of the first reference 1PPS signal by the specific time difference during the second period of the $(i+1)^{th}$ second in response to determining that the receiving time point is behind the predetermined time point by the specific time difference.

10. The master device according to claim 8, wherein the compensation estimation circuit is configured for:
  adding predetermined guard time after ending time of the synchronization signal frame to act as the predetermined time point in the second period of the $i^{th}$ second.

11. The master device according to claim 7, wherein the external time of date comprises epoch time, and the time of date circuit is configured for treating the epoch time as the first component of the first time of date information.

12. The master device according to claim 7, wherein the synchronization signal frame comprises the synchronization header, the first 1PPS signal, the first time of date information, and the first phase compensation information in sequence.

13. A synchronization correction method, suitable for a slave device, the method comprising:
  receiving a synchronization signal frame from a master device during a first period of an $i^{th}$ second, wherein the synchronization signal frame comprises a synchronization header, a first pulse per second (1PPS) signal, first time of date information, and first phase compensation information;
  correcting a transmission time point at which a first reference 1PPS signal is transmitted during a second period of the $i^{th}$ second according to the first phase compensation information, comprising:
    obtaining a predetermined time point at which the first reference 1PPS signal is transmitted during the second period of the $i^{th}$ second;
    delaying the predetermined time point by a specific time difference to act as the transmission time point in response to determining that the first phase compensation information instructs delayed transmission of the first reference 1PPS signal by the specific time difference; and
    advancing the predetermined time point by the specific time difference to act as the transmission time point in response to determining that the first phase compensation information instructs advanced transmission of the first reference 1PPS signal by the specific time difference; and
  transmitting the first reference 1PPS signal to the master device at the transmission time point during the second period of the $i^{th}$ second.

14. The method according to claim 13, wherein the step of obtaining the predetermined time point at which the first reference 1PPS signal is transmitted during the second period of the $i^{th}$ second further comprises:
  adding predetermined guard time after ending time of the synchronization signal frame to act as the predetermined time point.

15. A slave device, comprising:
  a receiver, configured for:
    receiving a synchronization signal frame from a master device during a first period of an $i^{th}$ second, wherein the synchronization signal frame comprises a synchronization header, a first pulse per second (1PPS) signal, first time of date information, and first phase compensation information; and
  a processing circuit, coupled to the receiver, configured for:
    correcting a transmission time point at which a first reference 1PPS signal is transmitted during a second period of the $i^{th}$ second according to the first phase compensation information, comprising:
- obtaining a predetermined time point at which the first reference 1PPS signal is transmitted during the second period of the $i^{th}$ second;
- delaying the predetermined time point by a specific time difference to act as the transmission time point in response to determining that the first phase compensation information instructs delayed transmission of the first reference 1PPS signal by the specific time difference; and
- advancing the predetermined time point by the specific time difference to act as the transmission time point in response to determining that the first phase compensation information instructs advanced transmission of the first reference 1PPS signal by the specific time difference; and transmitting the first reference 1PPS signal to the master device at the transmission time point during the second period of the $i^{th}$ second.

16. The slave device according to claim 15, wherein the processing circuit is configured for:
adding predetermined guard time after ending time of the synchronization signal frame to act as the predetermined time point.

* * * * *